United States Patent
Sendhoff et al.

(10) Patent No.: US 10,220,841 B2
(45) Date of Patent: Mar. 5, 2019

(54) METHOD AND SYSTEM FOR ASSISTING A DRIVER OF A VEHICLE IN DRIVING THE VEHICLE, VEHICLE AND COMPUTER PROGRAM

(71) Applicant: HONDA RESEARCH INSTITUTE EUROPE GMBH, Offenbach/Main (DE)

(72) Inventors: Bernhard Sendhoff, Offenbach (DE); Julian Eggert, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/299,699

(22) Filed: Oct. 21, 2016

(65) Prior Publication Data

US 2017/0113685 A1   Apr. 27, 2017

(30) Foreign Application Priority Data

Oct. 22, 2015 (EP) .................................... 15191060
Sep. 13, 2016 (EP) .................................... 16188472

(51) Int. Cl.
*B60W 30/09* (2012.01)
*B60W 50/00* (2006.01)
(Continued)

(52) U.S. Cl.
CPC ........ *B60W 30/09* (2013.01); *B60W 30/0956* (2013.01); *B60W 50/0097* (2013.01);
(Continued)

(58) Field of Classification Search
CPC ............. B60W 30/09; B60W 30/0956; B60W 50/0097; B60W 50/14; B60W 2050/0089;
(Continued)

(56) References Cited

U.S. PATENT DOCUMENTS 7,629,899 B2 * 12/2009 Breed .................. B60N 2/2863
340/435
8,160,811 B2 * 4/2012 Prokhorov ............. G08G 1/161
701/300
(Continued)

FOREIGN PATENT DOCUMENTS

DE 10 2011 106 176 A1 2/2012
DE 10 2012 005 272 A1 10/2012
(Continued)

OTHER PUBLICATIONS

European Search Report dated Mar. 7, 2017, issued in corresponding EP Application No. 16188472.1.

*Primary Examiner* — Rachid Bendidi
(74) *Attorney, Agent, or Firm* — Squire Patton Boggs (US) LLP

(57) ABSTRACT

An advanced driver assistant system and a method for assisting a driver of a vehicle in driving the vehicle. The system includes sensing means for sensing an environment of the vehicle, a storing unit for storing a database for storing prototypical situations associated with risk information, a processing unit and an output unit to output an assistance signal on the basis of which driver information can be output and/or vehicle operators can be actuated. The processing unit is configured to determine parameters of the vehicle and/or objects in the environment of the vehicle based upon the sensing means output, to classify a traffic situation on the basis of the determined parameters by comparing the determined parameters with parameters of the prototypical traffic situations, to extract risk information from the database and to calculate an expected risk for the encountered traffic situation on the basis of the extracted risk information.

14 Claims, 2 Drawing Sheets

(51) Int. Cl.
*B60W 50/14* (2012.01)
*B60W 30/095* (2012.01)
*G08G 1/16* (2006.01)
*G06N 5/04* (2006.01)
*G06N 7/00* (2006.01)
*G06N 99/00* (2019.01)
*G08G 1/01* (2006.01)
*G08G 1/0962* (2006.01)

(52) U.S. Cl.
CPC ............. *B60W 50/14* (2013.01); *G06N 5/047* (2013.01); *G06N 7/005* (2013.01); *G06N 99/005* (2013.01); *G08G 1/0112* (2013.01); *G08G 1/0129* (2013.01); *G08G 1/0133* (2013.01); *G08G 1/09626* (2013.01); *G08G 1/165* (2013.01); *G08G 1/166* (2013.01); *B60T 2210/32* (2013.01); *B60W 2050/0089* (2013.01); *B60W 2400/00* (2013.01); *B60W 2420/42* (2013.01); *B60W 2420/52* (2013.01); *B60W 2600/00* (2013.01)

(58) Field of Classification Search
CPC ......... B60W 2400/00; B60W 2420/42; B60W 2420/52; B60W 2600/00; B60W 30/095; B60W 50/16; G06N 5/047; G06N 7/005; G06N 99/005; G08G 1/163; G08G 1/166; G08G 1/165; G08G 13/93; G08G 13/931; B60T 2210/32; B60T 7/22; B62D 47/025; B62D 53/0871; B60Q 9/008
See application file for complete search history.

(56) References Cited

U.S. PATENT DOCUMENTS

| | | | | |
|---|---|---|---|---|
| 8,346,463 | B2* | 1/2013 | Bargman | G01C 21/00 701/117 |
| 8,841,994 | B2* | 9/2014 | Li | B60K 28/02 180/271 |
| 8,954,205 | B2* | 2/2015 | Sagar | G08G 1/164 701/1 |
| 9,443,426 | B1* | 9/2016 | Formwalt | G08G 1/04 |
| 2007/0005609 | A1 | 1/2007 | Breed | |
| 2008/0004806 | A1* | 1/2008 | Kimura | B60W 40/02 701/301 |
| 2009/0005959 | A1* | 1/2009 | Bargman | G01C 21/00 701/117 |
| 2009/0326796 | A1* | 12/2009 | Prokhorov | G08G 1/161 701/532 |
| 2010/0052945 | A1* | 3/2010 | Breed | B60N 2/2863 340/903 |
| 2013/0069773 | A1 | 3/2013 | Li et al. | |
| 2013/0116859 | A1* | 5/2013 | Ihlenburg | G06F 17/00 701/2 |
| 2013/0226400 | A1* | 8/2013 | King | G01C 21/32 701/36 |

FOREIGN PATENT DOCUMENTS

DE 102012025364 A1 7/2014
WO 2007114753 A1 10/2007

* cited by examiner

ME THOD AND SYSTEM FOR ASSISTING A
DRIVER OF A VEHICLE IN DRIVING THE
VEHICLE, VEHICLE AND COMPUTER
PROGRAM

BACKGROUND

Field

The invention is related to advanced driver assistant systems and methods (including automated driving) for assisting a driver in driving a vehicle, in particular a method and system that determines an expected risk for a current driving situation.

Description of the Related Art

Over the last years, many manufacturers tried to improve assistant systems of their vehicles. In particular, driver assistance systems that assist the driver in critical driving situations have been developed to mitigate the risk of being involved in an accident. Such systems often have the capability to sense the environment of the vehicle by using sensors that are mounted in a distributed fashion on the vehicle. Since there are a plurality of sensors available in the car it is possible to perceive the environment of the vehicle to a large extent. Based on such environment perception it is then possible to generate an environment representation that includes information about other traffic participants but also information about road structure, buildings and the like. Often it is calculated from such information from the environment of the vehicle a prediction for future movements not only of the ego-vehicle on which the system is mounted but also the movement of other traffic participants. Such prediction for future trajectories of vehicles that are involved in a current traffic situation allows calculation of a future risk, based on an analysis of the trajectories. Such approach is for example explained in DE 10 2012 005 272 A1 or DE 10 2011 106 176 A1.

On the other side, it is also possible to estimate a risk for the ego-vehicle based on physics modelling based risk estimation that uses velocity, mass and collision probabilities of vehicles. Furthermore, the prior art also discloses approaches that generate a risk map and the driver assistant system then calculates a path through this map that avoids points of high risk. The driver is informed about a path or a driving action he has to perform in order to follow such path.

The problem with all these known prior art approaches is that they only take into consideration risk factors that can be derived from the sensed environment in the current driving situation of the vehicle. However, in many cases knowledge already exists on particularly dangerous locations or types of intersection. For improving the driver assistant system it would therefore be desirable to improve risk estimation for a currently encountered traffic situation thereby profiting from accident statistics for example.

This is achieved by the method for assisting a driver of a vehicle in driving the vehicle, the corresponding system, vehicle and computer program product.

SUMMARY

According to the inventive method and system at first, the environment of the vehicle is sensed by sensing means to obtain information on the environment of the vehicle. Examples for sensors that are used in the sensing means of the vehicle may be for example radar sensors, lidar sensors, IMU (inertial measurement unit), odometry, cameras for object and traffic element detection, GPS (global positioning system) and the like. It is to be noted that the term "sensors", besides real sensors like radar sensors or lidar sensors, also include GPS or other systems that deliver as a "sensor output" position information of the vehicle.

Based on the sensor output then parameters of the vehicle and/or objects in the environment of the vehicle are determined in a processing unit. Such parameters in particular comprise information on a relation between vehicles (for example time to collision TTC, being an example for an indicator of a predicted risk) that are involved in a traffic situation. Also information on infrastructure elements and/or road structure can be taken into consideration. The road structure in particular is the geometry of the road, geometry of an intersection and preferably a number of lanes.

The inventive system furthermore includes a database that stores in a storing unit prototypical situations that may occur during driving. Such prototypical situation is an example for a typical situation that is characterized by temporally and spatially localized constellation of elements such as road elements, ego-vehicle and other traffic participants. It further advantageously includes information on the respective states such as driving direction, velocity of involved traffic participant and so an. Based on the parameters that are determined for the vehicle and/or the objects in the environment of the vehicle a comparison with parameters of the prototypical traffic situations that are stored in a data base is conducted in the processing unit. The outcome of such a comparison is a classification of a traffic situation. This means that one or several prototypical situations are identified that are closest to the currently encountered traffic situation of the vehicle. For each of the prototypical situations that are stored in the data base risk information is stored associated with the respective prototypical situation. Such risk information that is associated with the respective prototypical situation is extracted from the database by the processing unit and based on the extracted risk information then an expected risk for the encountered traffic situation is calculated.

Finally, for assisting the vehicle driver, the driver information is output and/or vehicle controls are actuated based on the calculated expected risk in order to mitigate the risk or at least give a warning to the driver so that he can decide how to handle the current traffic situation.

The present invention has the advantage that not only information that is derived from the currently sensed driving environment of the vehicle is used in order to determine an expected risk, but also information that is stored in a database is used. In essence, the assistance for the driver is thus based on a situation analysis and additionally on risk information from the database. The selection of the risk information that has to be used in calculating a risk estimation for the currently encountered driving situation is performed by matching the currently encountered driving situation with prototypical driving situations. Thereby it is ensured that only relevant risk information is used for driver assistance.

In the database, a plurality of prototypical situation is stored and for each for these prototypical situations, a set of values that describe the risk in such situation is stored. Such information can be for example, a frequency of accidents that happen in the particular prototypical situation. Thus, apart from the information that is derived from the current driving situation that is observed by the sensing means of the vehicle, also more general information or information that is collected is used for risk estimation.

In the sub-claims, advantageous embodiments of the inventive method and system are defined.

In particular, it is advantageous to update the database over time. For such updating, the sensor signals that are obtained during driving operation of the vehicle can be used. Thus, if based on the sensor outputs in a commonly known manner, a potential risk for the ego-vehicle can be determined, this information can be used in order to add new information to the database. This is in particular advantageous if it is performed for a plurality of vehicles. In that case, the plurality of vehicles supply a common database with new information. The information on risks that is held in the database therefore has a broader basis and thus is statistically more relevant. In order to ensure that any of the vehicles that is equipped with the inventive system can make use of such common database, it is furthermore advantageous to provide a connection between the common database and the database that is mounted in the vehicle. Thus, the common database can be used to update the local database of the vehicle by copying the latest version of the common database.

Furthermore, it is advantageous to determine a vehicle position as one parameter, to analyze driving situations using the road geometry information around that position, and to define the prototypical situations by their specific road configuration pattern. The risk information that is stored associated with the prototypical situation which in such a case is a particular type of intersection for example, can comprise a plurality of accident types. Thus, risk information for a particular accident type can be selected based on the determined vehicle position. For a particular intersection type, it is for example possible to approach this intersection from different directions. For each of the different directions it is possible to store risk information for the prototypical situation. According to the position of the vehicle, it is then selected which of the accident types is relevant for calculating the expected risk that is determined from risk factors analyzed from the sensor outputs with risk information that is extracted from the database. The combination of the risk factors and the extracted risk information is then used in order to calculate the expected risk. This has the advantage that not only statistical information is used, but also aspects that can be derived directly from the presently encountered traffic situation.

Furthermore, vehicle dynamics can be determined from the sensor outputs and these vehicle dynamics are additionally used in classification of the traffic situation. Thus, such dynamics can be used to more precisely determine the currently encountered traffic situation and optimize the result of the classification with respect to the prototypical situations.

BRIEF DESCRIPTION OF THE DRAWINGS

The invention will now be described with respect to the annexed drawings in which.

DETAILED DESCRIPTION

Figure 1:
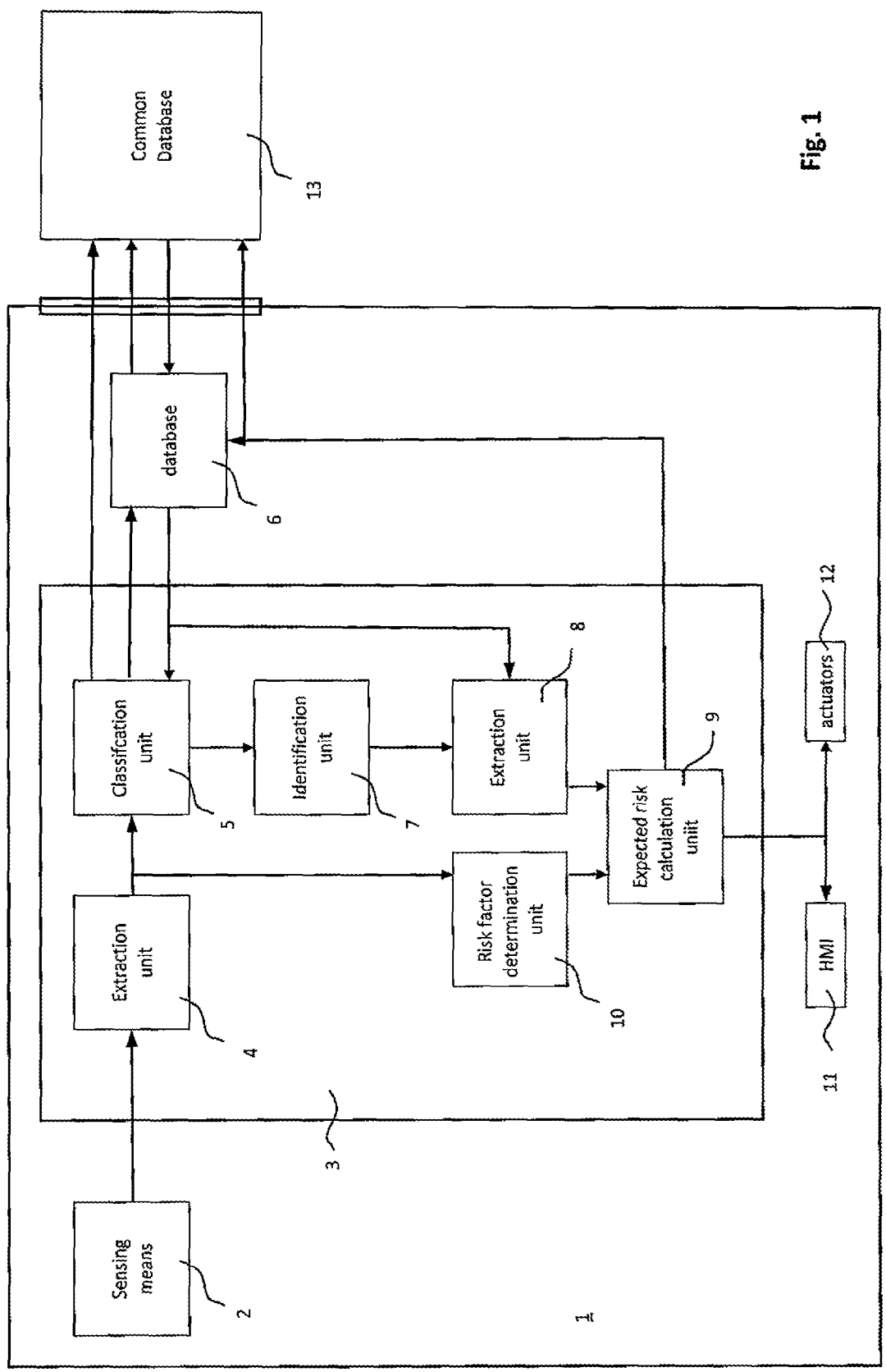
FIG. 1 is an overview over the structure of the system for assisting a driver.

In FIG. 1, an overview of the inventive system is shown with respect to an entire vehicle 1. Vehicle 1 is equipped with a plurality of sensors that commonly are denoted as sensing means 2. Such sensors may be cameras, radar sensors, laser sensors or the like. It is in particular to be noted that the term "sensors" according to the present invention also comprises virtual sensors. Such virtual sensor may be for example a GPS which is able to determine a current absolute position of the vehicle in spatial coordinates. Such spatial coordinates are then considered to represent a sensor output of a GPS sensor. Also a map database is considered to be such virtual sensor, because digital maps allow easy access to important data like geometrical road configuration, number and width of lanes as well as incoming or outgoing road segments of an intersection. The output of the sensing means 2 is transmitted to a processing unit 3. The processing unit 3 at first comprises an extraction unit 4 for extracting situation features (or descriptors) from the sensor results. Such feature extraction per se is already known from other prior art systems and thus the details thereof are not explained repeatedly. The features may for example be used to generate an environment representation in which all the sensed objects and elements of the environment of the vehicle and their relation to each other and in particular their relation to the ego-vehicle are defined.

The features that are determined by the feature extraction section 4 are then transmitted to a classifier 5. The classifier 5 is connected to a database that is stored in a storage unit 6. The classifier 5 is capable of reading in the entries in the database and thus has access to the parameters that define prototypical situations in the database. In the classifier 5, the parameters that are determined by the feature extraction section 4 and the parameters that describe a pattern of the prototypical situations in the database are compared with each other. For comparing such sets of parameters, the state of the art provides a plurality of pattern matching techniques such as for example, neural networks, Bayesian Nets or the like.

The classifier 5 is furthermore connected to an identification section 7 that is used to identify the most relevant prototypical situations from which then the risk information associated therewith shall be extracted. The identified prototypical situations are supplied to an extraction section 8 that has also access to the entries in the database. The extraction section 8 reads in the risk information that is stored in the database associated with each of the prototypical situations that were identified by identification section 7. Based on this risk information then in a risk estimation section 9 an expected risk for the ego-vehicle is calculated. Basically the calculation of the expected risk can be performed as it is known from the prior art. The calculation can be based on risk factors that are determined from the environment sensing alone or preferred based on risk factors from the risk information from the database and additional risk factors determined from the sensing means output.

To achieve this in addition to the risk information that is extracted from the database, the extraction section 4 is connected to a risk factor determination section 10. In the risk factor determination section 10 additional risk factors are determined from the sensed environment. The additional risk factors are features derived from an analysis of the sensed environment which allow an estimation of the involved risk of a situation. The standard way is to calculate risk factors based on a prediction of the future states of the ego car and other traffic participants (e.g. future trajectory, velocity behavior, traffic light switching, etc.) in the vicinity with the purpose to calculate the likelihood that there will e.g. be a collision because the trajectories intersect. This is also the case for very simple risk indicators like e.g. Time-To-Collision (TTC), which is usually calculated as the time until two traffic participants meet each other if they continue moving longitudinally with some assumed velocity and acceleration, and generally for the so-called TTX indicators which are the most widely used risk indicators for ADAS. The additional risk factors that are determined from the sensed environment and the risk factor of the risk information that is extracted from the database are then combined in the risk estimation section 9. Thus, for estimating the risk that is expected for the ego-vehicle not only a general approach on the basis of for example accident statistics or more generally risk information gained from repeated observation, analysis and pattern extraction of driving situations in the past is used, but also the current driving situation of the vehicle. The overall estimation of the expected risk is therefore improved with respect to prior art approaches. The expected risk is a measure for the expectation that a dangerous or costly event, for example an accident will happen in the proximal future.

Risk is commonly defined as probability of occurrence of a detrimental event, multiplied with the severity of the event assuming that it actually occurs. It can be quantified in terms of accident cost. For example, a crash of cars at a certain relative velocity to each other might have a certain accident severity; a similar crash with higher relative velocity is then expected to have a higher severity.

The expected risk that is calculated in the risk estimation section 9 is then forwarded to a human machine interface 11 and/or to actuators 12 of vehicle 1.

When the human machine interface 11 is used a warning or a notification of the driver can be output in a way that is already known from the prior art. In particular, a specific entrance to an intersection of a particular intersection type can be pointed at or marked in a map that is presented to the driver in order to draw the attention of the driver to that specific entrance, and eventually to the major involved risks.

The embodiment is described on the assumption that the database is mounted on the vehicle 1 but it is sufficient that the processing unit has access to such database.

According to an embodiment of the invention, the database is updated and extended by using the vehicle's recorded data. The database can be available locally if stored in the storage unit 6 in this case, updating the database occurs by evaluating the own vehicles driving statistics only. Alternatively, a common database 13 can be accessible online, for example over cloud technology. In this case several vehicles would send their situation analysis results and their respective locations to some cloud services which take care of the database update. In both cases, the involved vehicles would sense the environment and analyze their current driving situation as well as estimating the current risk by some well known risk indicators from state-of-the-art, and if these risk indicators trespass a critical threshold (like e.g. a close approximation between two cars at high speed, or a hard braking avoidance maneuver), the driving situation parameters together with additional parameters like the position is sent to the common database. In the database, the situation pattern is then compared with already existing patterns (prototypical situations) and if there is a match, the situation pattern description as well as the associated risk data are updated. If the situation pattern is new/unknown, it is registered as such in the database.

Figure 2:
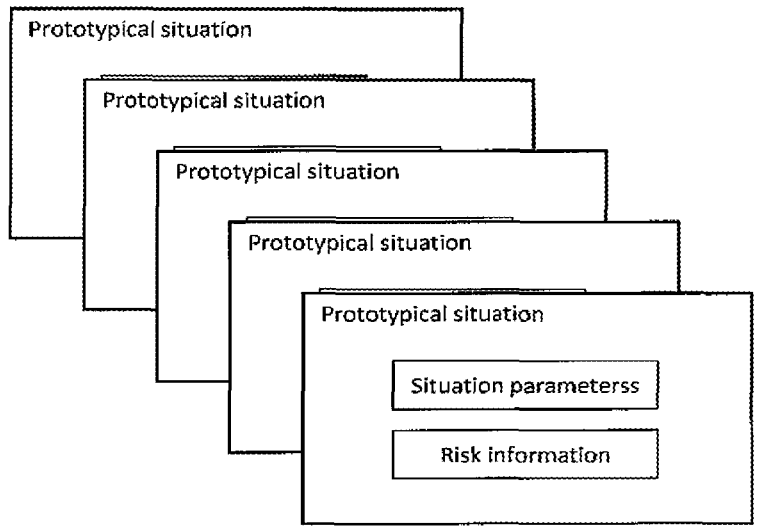
FIG. 2 an illustration of the structure of information stored in the database.

In FIG. 2 the structure of the data as stored in the database is illustrated. Each dataset that is stored in the database corresponds to a prototypical situation. One dataset corresponds to one prototypical situation and describes a pattern of descriptors or parameters that describe a particular traffic situation. Each such prototypical situation further comprises information about accident statistics in a detailed manner.

Thus, the prototypical situation describes a typical constellation of entities and events that occurred during the accidents including map-based information like the associated location and road structure. Also the event type which means which type of accident occurred. Such accident types may be vehicle to vehicle accident, vehicle to infrastructure accident, vehicle to pedestrian, loss of control, head-on or rear-bump accident, etc. Thus, in the database for each prototypical situation information is stored that combines road and position data with situation data. This means that for example information can be given expressing that "at that a particular intersection, N front-crash car to car accidents occurred with a car A entering the intersection from south while another car B was crossing the intersection from east to west", but at the same intersection, "rear-end crashes occurred at the west entrance when the traffic light was red". Thus, different accident scenarios related to one particular intersection can be associated to different prototypical situations.

Risk information may comprise different statistics related to the quantification of the expected risk for the particular prototypical situation. For example, risk information may include the frequency of occurrence of accidents related to that situation, the recorded severity and the most important risk factors that should be considered because they have the largest impact on the expected risk. This can be for example the speed of the other car or that the accident happened with higher probability when the traffic light was red.

Figure 3:
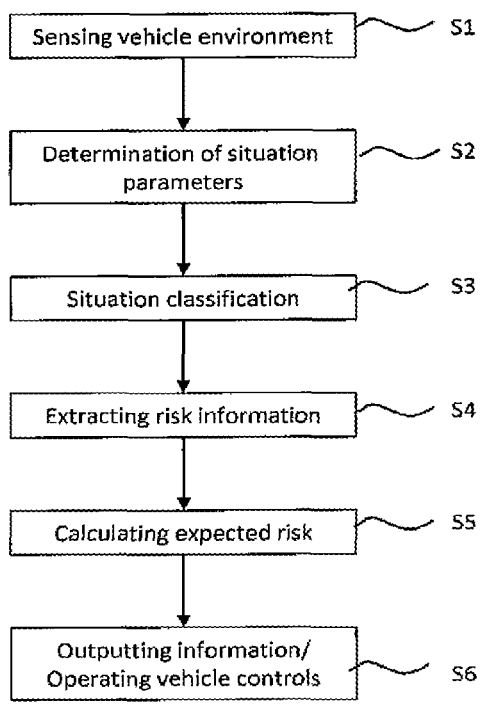
FIG. 3 a simplified flowchart to explain the method steps of the inventive method.

In FIG. 3 a simplified flowchart is illustrated to explain the method for assisting a driver in driving a vehicle. At first, in step S1 the environment of the vehicle is sensed by the sensors that are mounted on the vehicle. From the sensor results then in step S2 parameters of the vehicle and/or objects in the environment of the vehicle are determined. The traffic situation that is thus described by these parameters is then classified by comparing the parameters that are determined from the sensor outputs in step S3 with parameters that define the prototypical traffic situations of the database.

After the most relevant prototypical traffic situations, which means the ones corresponding closest to the encountered traffic situation of the vehicle, have been estimated, risk information associated with each of the prototypical situations is extracted from the database (step S4). Then an expected risk for the encountered traffic situation for the vehicle on which the inventive system is mounted is calculated on the basis of the extracted risk information in step S5. Finally, the driver information is output and/or vehicle operation controls are actuated on the basis of the calculated expected risk and the classified traffic situation (step S6).

The invention claimed is:

1. A method for assisting a driver of a vehicle in driving the vehicle, comprising the steps of:
   sensing an environment of the vehicle by sensors mounted on the vehicle;
   determining parameters of the vehicle or objects in the environment of the vehicle on the basis of the sensor outputs, wherein a vehicle position is determined as one parameter of the determined parameters;
   classifying an encountered traffic situation on the basis of the determined parameters by comparing the determined parameters with parameters of prototypical traffic situations that are stored in a database, wherein each of the prototypical traffic situations is related to one specific road and environment object configuration pattern;

extracting, from the database, risk information associated with the encountered traffic situation from the classification and the respective prototypical traffic situations,
wherein the risk information associated with the prototypical traffic situation includes risk information on most frequent accident types for the respective prototypical traffic situation and the vehicle position;
calculating an expected risk for the encountered traffic situation on the basis of the extracted risk information; and
outputting driver information or actuating vehicle controls on the basis of the calculated expected risk in addition to the classified traffic situation,
wherein the risk information comprises statistics related to a quantification of an expected risk for the respective prototypical traffic situation.

2. The method according to claim 1, wherein
the database is updated over time using the sensor signal during operation.

3. The method according to claim 2, wherein
the database is updated by first updating a common database that is stored externally from the vehicle(s) which is then copied to the vehicle.

4. The method according to claim 1, wherein
the database is updated over time using monitoring signals of sensors of a plurality of vehicles which are in communicative connection with the database.

5. The method according to claim 1, wherein
the risk information on one of the accident types is selected on the basis of the vehicle position.

6. The method according to claim 1, wherein
risk factors are determined from the sensor outputs, and these risk factors are used in addition to the risk information extracted from the database to calculate the expected risk.

7. The method according to claim 1, wherein
vehicle dynamics are determined from the sensor outputs and these vehicle dynamics are used in classification of the traffic situation.

8. An advanced driver assistant system for assisting a driver of a vehicle in driving the vehicle, said system comprising a processor connected to a storage unit, the system comprising:
sensing means for sensing an environment of the vehicle; and
a database stored in the storage unit storing prototypical traffic situations associated with risk information,
wherein the processor is configured to
determine parameters of the vehicle or objects in the environment of the vehicle on the basis of the sensing means output, wherein a vehicle position is determined as one parameter of the determined parameters,
classify a traffic situation on the basis of the determined parameters by comparing the determined parameters with parameters of the prototypical traffic situations, wherein each of the prototypical traffic situations is related to one specific road and environment object configuration pattern,
extract risk information from the database and to calculate an expected risk for the encountered traffic situation on the basis of the extracted risk information,
wherein the risk information associated with the prototypical traffic situation includes risk information on most frequent accident types for the respective prototypical traffic situation and the vehicle position, and
output an assistance signal on the basis of the calculated extracted risk information in addition to the classified traffic situation to a human machine interface or to controls of the vehicle, and
wherein the risk information comprises statistics related to a quantification of an expected risk for the respective prototypical traffic situation.

9. The advanced driver assistant system according to claim 8, wherein
the system comprises a common database.

10. The advanced driver assistant system according to claim 8, wherein
the sensing means is configured to determine at least the position of the vehicle.

11. The advanced driver assistant system according to claim 10, wherein
the processor is configured to select risk information that is stored associated with a specific road configuration defining a prototypical traffic situation on the basis of the vehicle position.

12. The advanced driver assistant system according to claim 8, wherein
the processor is further configured to determine risk factors from the sensing means output and to combine these risk factors and the extracted risk information when the expected risk is calculated.

13. The advanced driver assistant system according to claim 8, wherein
the processor is further configured to determine from the sensing means outputs vehicle dynamics and to base the classification of the traffic situation also on these vehicle dynamics.

14. A computer program embodied on a non-transitory computer-readable medium, said computer program, when executed by a processor, causes the processor to:
sense an environment of the vehicle by sensors mounted on the vehicle;
determine parameters of the vehicle or objects in the environment of the vehicle on the basis of the sensor outputs, wherein a vehicle position is determined as one parameter of the determined parameters;
classify an encountered traffic situation on the basis of the determined parameters by comparing the determined parameters with parameters of prototypical traffic situations that are stored in a database, wherein each of the prototypical traffic situations is related to one specific road and environment object configuration pattern;
extract, from the database, risk information associated with the encountered traffic situation from the classification and the respective prototypical traffic situations,
wherein the risk information associated with the prototypical traffic situation includes risk information on most frequent accident types for the respective prototypical traffic situation and the vehicle position;
calculate an expected risk for the encountered traffic situation on the basis of the extracted risk information; and
output driver information or actuating vehicle controls on the basis of the calculated expected risk in addition to the classified traffic situation, wherein the risk information comprises statistics related to a quantification of an expected risk for the respective prototypical traffic situation.

* * * * *